United States Patent
Li et al.

(10) Patent No.: US 9,619,103 B2
(45) Date of Patent: Apr. 11, 2017

(54) METHOD AND SYSTEM FOR PROMPTING AN ADJUSTABLE DIRECTION OF A CURSOR

(71) Applicant: Acer Inc., New Taipei (TW)

(72) Inventors: Chien-Hung Li, New Taipei (TW); Yueh-Yarng Tsai, New Taipei (TW); Yu-Hsuan Shen, New Taipei (TW)

(73) Assignee: Acer Inc., New Taipei (TW)

( * ) Notice: Subject to any disclaimer, the term of this patent is extended or adjusted under 35 U.S.C. 154(b) by 511 days.

(21) Appl. No.: 14/165,870

(22) Filed: Jan. 28, 2014

(65) Prior Publication Data

US 2015/0074607 A1 Mar. 12, 2015

(30) Foreign Application Priority Data

Sep. 9, 2013 (TW) .............................. 102132497 A (51) Int. Cl.
*G06F 3/0481* (2013.01)
*G06F 3/0488* (2013.01)
*G06F 3/16* (2006.01)
*G06F 3/01* (2006.01)

(52) U.S. Cl.
CPC ........ *G06F 3/04812* (2013.01); *G06F 3/0488* (2013.01); *G06F 3/04817* (2013.01); *G06F 3/01* (2013.01); *G06F 3/16* (2013.01)

(58) Field of Classification Search
CPC ................. G06F 3/04812; G06F 3/016; G06F 2203/04801
USPC .................................................. 715/857–858
See application file for complete search history.

(56) References Cited

U.S. PATENT DOCUMENTS

| | | | | |
|---|---|---|---|---|
| 5,952,995 A | * | 9/1999 | Barnes .................. | G06F 3/0485 345/157 |
| 6,606,082 B1 | * | 8/2003 | Zuberec .............. | G06F 3/04892 345/156 |
| 2006/0242605 A1 | * | 10/2006 | Kim ...................... | G06F 9/4443 715/855 |
| 2009/0251410 A1 | * | 10/2009 | Mori .................... | G06F 3/04812 345/157 |
| 2009/0288043 A1 | * | 11/2009 | Willis ................... | G06F 3/0488 715/859 |
| 2011/0225492 A1 | * | 9/2011 | Boettcher ............. | G06F 3/0485 715/702 |

(Continued)

FOREIGN PATENT DOCUMENTS

TW 200818113 A 4/2008
TW M349637 U 1/2009

*Primary Examiner* — Steven Sax
*Assistant Examiner* — Le Nguyen
(74) *Attorney, Agent, or Firm* — Alan D. Kamrath; Kamrath IP Lawfirm, P.A.

(57) ABSTRACT

A prompting method of an adjustable direction of a cursor for a portable electronic apparatus includes the follow steps: detecting a location of a cursor in a display, with the cursor indicating an indicated direction; determining whether any set direction corresponding to the location of the cursor is different from the indicated direction; and if any set direction corresponding to the location of the cursor is different from the indicated direction, displaying a directional adjustment prompting information for prompting at least one adjustable direction of the cursor corresponding to the location of the cursor.

2 Claims, 8 Drawing Sheets

(56) References Cited

U.S. PATENT DOCUMENTS

| | | | |
|---|---|---|---|
| 2012/0044172 A1* | 2/2012 | Ohki | G06F 3/04883 345/173 |
| 2013/0086503 A1* | 4/2013 | Kotowski | G06F 3/04886 715/773 |
| 2014/0040833 A1* | 2/2014 | McLean | G06F 3/0488 715/856 |

* cited by examiner

METHOD AND SYSTEM FOR PROMPTING AN ADJUSTABLE DIRECTION OF A CURSOR

BACKGROUND OF THE INVENTION

1. Field of the Invention

The present invention relates to a method for prompting an adjustable direction of a cursor and, particularly, to a method for prompting an adjustable direction of a cursor based on different locations of the cursor on the display to prompt an adjustable direction corresponding to the location of the cursor. The invention also comprises a system for prompting an adjustable direction of a cursor in the application of the method.

2. Description of the Related Art

Figure 1:
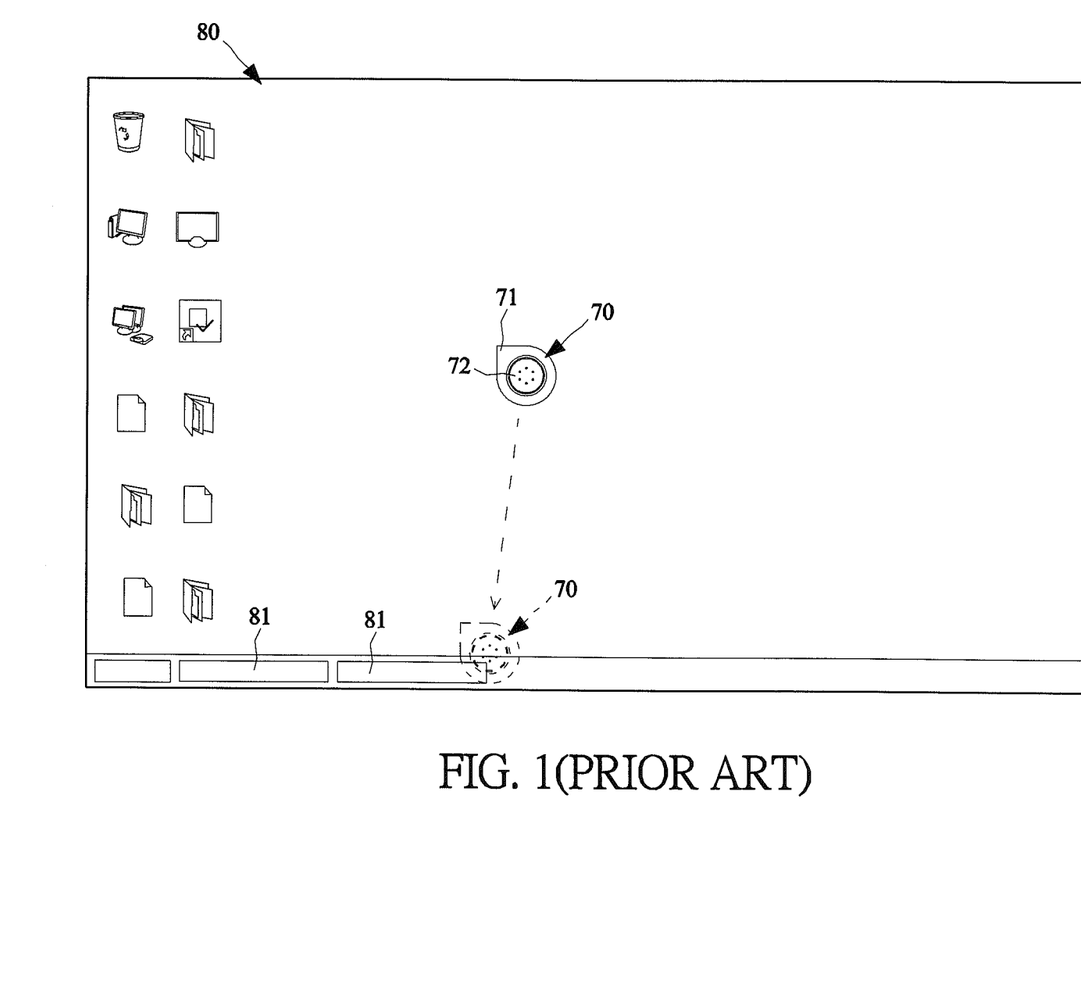
FIG. 1 is a schematic diagram of the cursor used in the display in the prior art.

The present generation of operating systems has begun to support touch features so that users can directly, through the touch panel of the electronic device, operate traditional window-based interfaces. However, when the touch panel is small and the image resolution is high, it may be hard to accurately touch the objects displayed on the panel because the objects are too small. To solve this problem, some manufacturers have designed a touch-sensitive cursor similar to general mouse cursors, such as the floating touchpad, to assist the user in performing a touch operation. As shown in FIG. 1, when the touch-sensitive cursor 70 is displayed on the display 80, the user can use the touch mode to press and move the touch-sensitive cursor 70. With the cursor tip 71 of the touch-sensitive cursor 70, the object to be selected can be accurately operated.

Although the touch-sensitive cursor 70 improves the aforementioned problem of being unable to accurately touch an object, in the operation of the touch-sensitive cursor 70, the touch-sensitive cursor 70 must have a certain range of the area of the touch and pressure part 72 for users to touch and press to move smoothly. Therefore, if the cursor tip 71 of the touch-sensitive cursor 70 can only maintain a fixed direction (fixed toward the upper left, for example), for the objects 81 close to the bottom edge of the display, the user is unable to continue to control the touch-sensitive cursor 70 to move downwards (moving the touch-sensitive cursor 70 to the position shown by the dotted line, for example), and those objects 81 will not be able to be smoothly touched by the cursor tip 71 of the touch-sensitive cursor 70, thereby causing the user inconvenience.

Therefore, it is necessary to design direction tuning tips as well as transformation mechanisms of the cursor tip of the aforementioned touch-sensitive cursor to effectively eliminate the problems of the touch-sensitive cursor of the prior art.

SUMMARY OF THE INVENTION

A prompting method of an adjustable direction of a cursor for a portable electronic apparatus is disclosed. The method comprises the follow steps: detecting a location of a cursor on a display, with the cursor tip indicating an indicated direction; determining whether any set direction corresponding to the location of the cursor is different from the indicated direction; and if any set direction corresponding to the location of the cursor is different from the indicated direction, displaying a directional adjustment prompting information for prompting at least one adjustable direction of the cursor corresponding to the location of the cursor.

DETAILED DESCRIPTION OF THE PREFERRED EMBODIMENTS

The main purpose of the present invention is to provide a method for prompting an adjustable direction of a cursor based on different locations of the cursor on the display to prompt an adjustable direction corresponding to the location of the cursor.

In order to achieve the aforesaid purpose, the prompting method of an adjustable direction of a cursor of the present invention is applied to a portable electronic apparatus. The method comprises the following steps: detecting the location of the cursor in the display, with the cursor tip pointing to an indicated direction, and determining if any set direction corresponding to the location of the cursor is different from the indicated direction. If any set direction corresponding to the location of the cursor is different from the indicated direction, an adjusting direction is displayed as prompting information to prompt at least one adjustable direction of the cursor corresponding to the location of the cursor.

The present invention also comprises a system for prompting an adjustable direction of a cursor in the application of the aforementioned method.

Accordingly, when the user moves the cursor to an arbitrary position of the display, by the methods of the present invention, according to the current location of the cursor and the direction indicated by the cursor, the reference of the direction indicated by the adjustable cursor will prompt the user to adjust the direction indicated by the cursor depending on the demands of the user to improve the convenience and practicality of operation.

To clarify the above and other purposes, features and advantages of this invention, the specific embodiments of this invention are especially listed and described in detail with the attached figures as follows.

Figure 2:
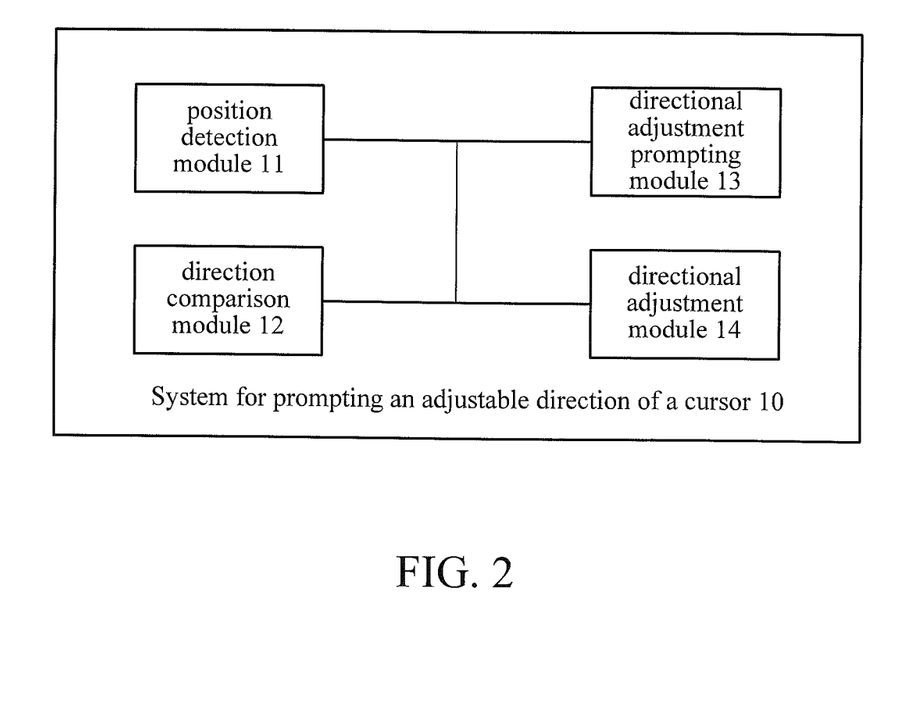
FIG. 2 is a system block diagram of the system for prompting an adjustable direction of a cursor of the present invention.

Please refer to FIG. 2, which is a system block diagram of the system for prompting an adjustable direction of a cursor 10 of the present invention. The system for prompting an adjustable direction of a cursor 10 of the present invention is used in a portable electronic apparatus and is particularly applied to a electronic apparatus supporting the input function of the touch screen, such as smart phones, tablets, and computers with touch screens. However, the present invention is not limited to those electronic apparatuses.

The aforementioned electronic apparatus comprises a processing unit, a storage unit, and a display unit (not shown in FIG. 2). The processing unit (such as the central processing unit) is used to issue commands to execute the operating system or application stored in the storage unit (such as memory or hard disk) and to display the corresponding display information on the display unit. This display can be the system interface of the operating system or the program interface of an application. The display displays the cursor for operation (such as the mouse cursor or the floating touchpad). The cursor points to an indicated direction by a cursor tip. When the user performs the touch operation, the cursor tip is the corresponding touch input point. In one embodiment of the present invention, the operating system can be a Microsoft windows system (e.g., Windows 8) that supports touch input, but the present invention is not limited to that type of operating system. Since the aforementioned processing unit, the storage unit, and the display unit are necessary components of common electronic devices, there is no need for further description of those components.

As shown in FIG. 2, the system for prompting an adjustable direction of a cursor 10 of the present invention comprises a position detection module 11, a direction comparison module 12, and a directional adjustment prompting module 13, which are electrically connected to each other. In one embodiment of the present invention, the position detection module 11, the direction comparison module 12, and the directional adjustment prompting module 13 can be applications or hardware chips that perform specific functions, but they are not limited to those embodiments. The aforementioned modules can also be a combination of two or more of hardware, software, and firmware.

The position detection module 11 is used for detecting the current location of the cursor on the display. The position detection module 11 can determine the current location of the cursor on the display by detecting the corresponding coordinates of the current location of the cursor. However, the present invention is not limited to that way. The position detection module 11 can also detect the location of the cursor in other ways.

In an embodiment of the present invention, the position detection module 11 can divide the display into a plurality of areas of the touch-sensitive touch panel of the portable electronic apparatus and set each area to correspond to at least one set direction respectively. The so-called set direction thus set is the corresponding direction when the cursor is located in different areas. The set direction in a different area can be the same or different from each other. It should be noted that the method of dividing into a plurality of areas and the number of areas formed can be changed according to different designs.

The direction comparison module 12 is used to determine if any set direction corresponding to the location of the cursor is different from the indicated direction. The cursor will indicate the indicated direction by the cursor tip. The aforementioned divisions of the plurality of areas have respectively at least one corresponding set direction. Therefore, the direction comparison module 12 compares whether any set direction corresponding to the location of the cursor is different from the current direction indicated by the cursor.

The directional adjustment prompting module 13 is used to prompt at least one adjustable direction of the cursor corresponding to the location of the cursor. According to the position of the cursor, the at least one adjustable direction comprises the aforementioned set direction. The directional adjustment prompting module 13 can display adjustment prompting information of a direction on the display to prompt at least one adjustable direction of the cursor to the user. Here, the directional adjustment prompting information can be displayed with the cursor and move with the cursor to facilitate the user to instantly confirm or operate a function. However, the directional adjustment prompting information can also be constantly displayed in the corners of the display or in another location. In addition, the directional adjustment prompting module 13 can change the displaying position of the directional adjustment prompting information based on user settings or by determining the changes in the position of the cursor in the display. For example, the directional adjustment prompting module 13 can display the directional adjustment prompting information on either the left side or the right side of the cursor according to the left- or right-handedness of the user specified in the user settings. As another example, when the cursor is located too close to the edge of the display, the directional adjustment prompting module 13 can adjust the displaying position of the prompting information to prevent the adjustment prompting information from moving beyond the border of the display.

Furthermore, the system for prompting an adjustable direction of a cursor 10 of the present invention comprises a directional adjustment module 14. The directional adjustment module 14 changes the instruction based on the direction-changing instruction entered by the user to adjust the corresponding direction indicated by the cursor.

Figure 3:
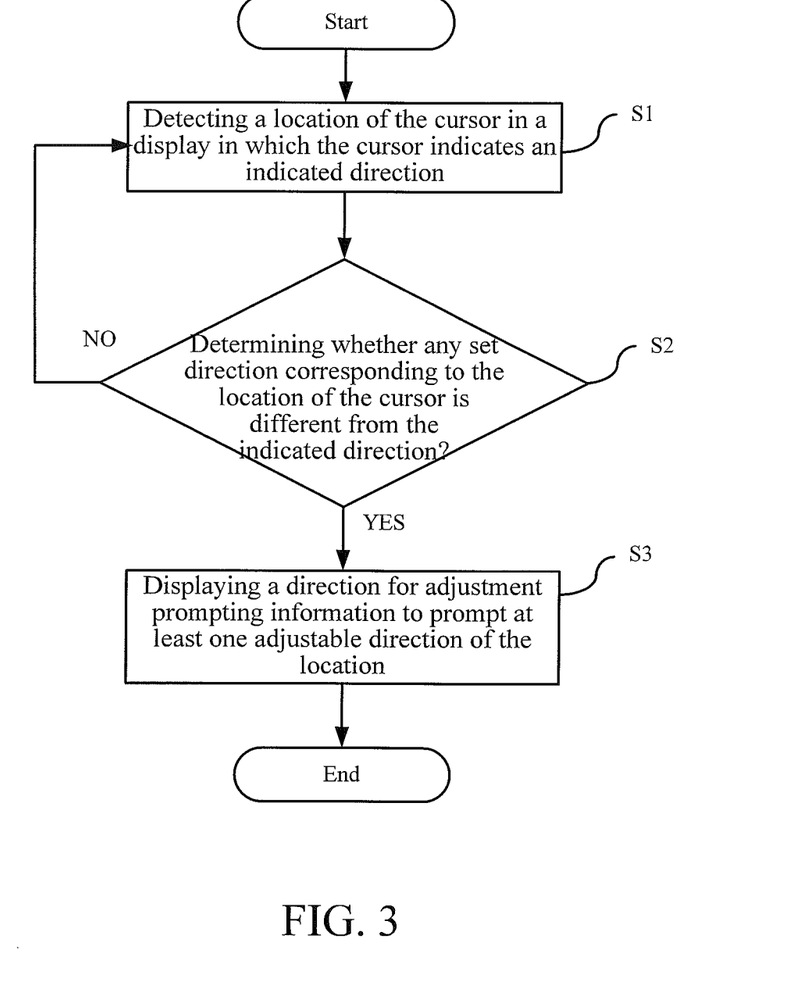
FIG. 3 is a flow chart of the method for prompting an adjustable direction of a cursor of the present invention.

Please refer to FIG. 3, which is a flow chart of the method for prompting an adjustable direction of a cursor of the present invention. It should be noted that, although the system for prompting an adjustable direction of a cursor 10 shown in FIG. 2 is presented as an example to describe the prompting method of an adjustable direction of a cursor of the present invention, the present invention is not limited thereto. As shown in FIG. 3, the prompting method of an adjustable direction of a cursor of the present invention comprises steps S1, S2, and S3. In the following section, the steps of the method will be described in detail.

S1: Detecting a location of the cursor in a display in which the cursor indicates an indicated direction.

The prompting method of an adjustable direction of a cursor of the present invention can determine the corresponding display direction to adjust the prompting information based on the location of the cursor in a display. Thus, when the user moves the cursor to any position in the display depending on needs, the position detection module 11 detects the current position of the cursor in the display.

Figure 4A:
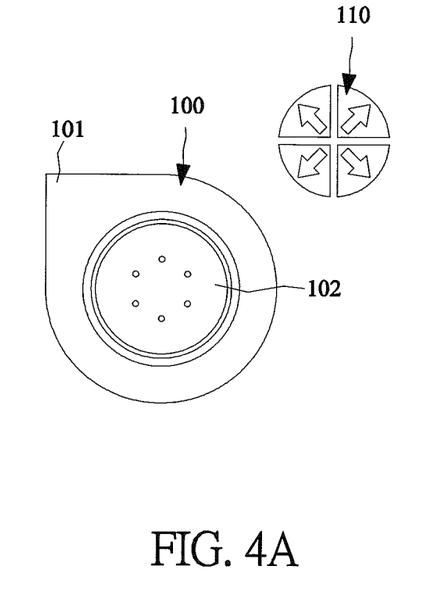
FIG. 4A is a schematic diagram of a cursor of a portable electronic apparatus of the present invention.
Figure 4B:
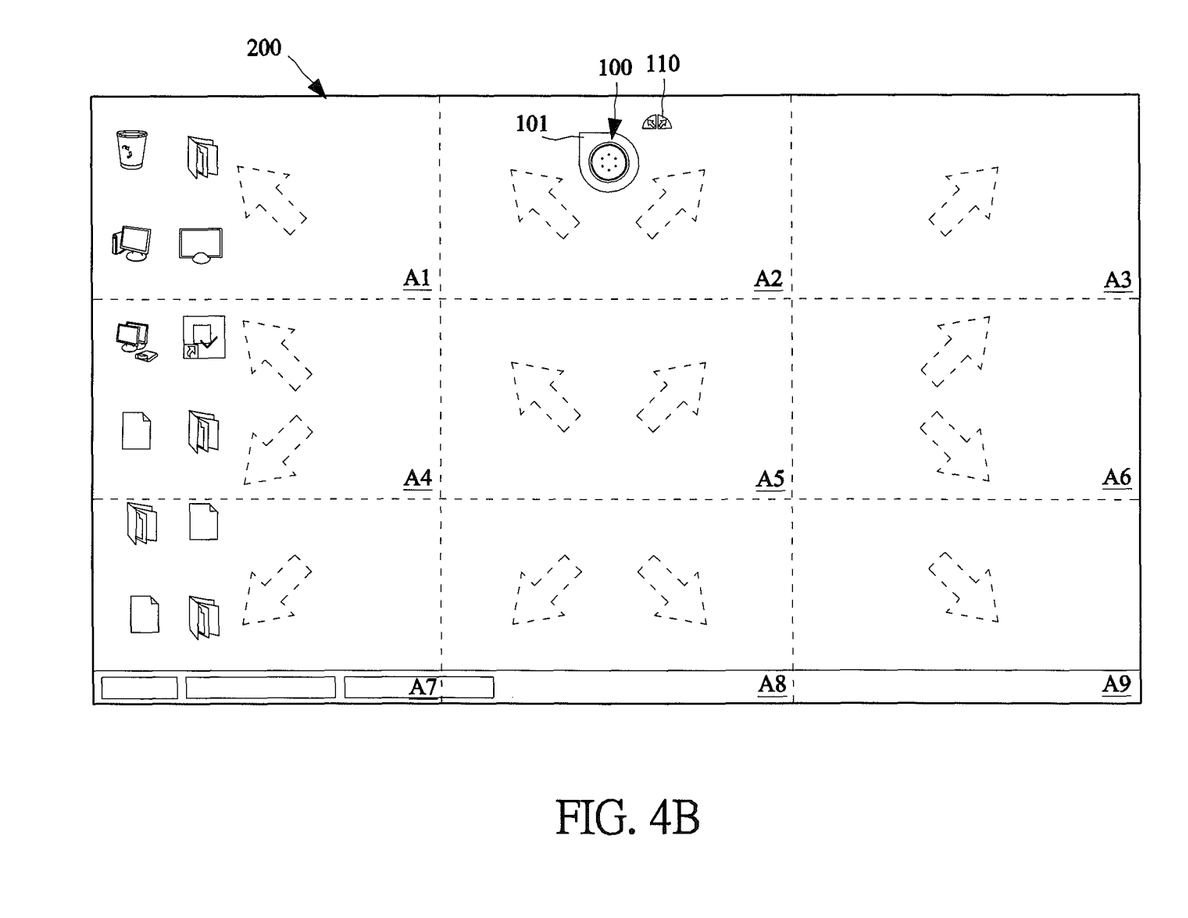
FIG. 4B is a schematic diagram of the divided areas of the display of the portable electronic apparatus of the present invention.

Hereinafter, refer to FIG. 4A and FIG. 4B. FIG. 4A is a schematic diagram of the cursor of a portable electronic apparatus of the present invention. FIG. 4B is a schematic diagram of the divided areas of the display of the portable electronic apparatus of the present invention.

As shown in FIG. 4A, in an embodiment of the present invention, the cursor 100 is a touch-sensitive cursor comprising a cursor tip 101 and a touch and press part 102. When the cursor 100 is positioned anywhere on the display, the cursor tip 101 indicates an indicated direction. The touch and press part 102 is provided for the user to operate touching and pressing functions to control or move the cursor 100. For example, the default cursor tip 101 of the cursor 100 is generally toward the upper left corner of the cursor 100.

In this embodiment, the directional adjustment prompting information adopts the form of an icon button 110 displayed around the cursor 100 (for example, to the upper right of the cursor 100 in FIG. 4A). The icon button 110 can comprise four directional buttons of upper left, lower left, upper right and lower right, and each directional button will be displayed or not displayed based on different locations of the cursor 100, but the implementation state of the icon button 110 in FIG. 4A is not limited thereto. For example, the icon button 110 can be displayed in different ways according to different locations. For example, the buttons indicating the different directions can be rendered with different colors, different sizes, solid lines, or dotted lines. The user can directly contact the corresponding direction button of the icon button 110 to enter the relevant operating instructions.

As shown in FIG. 4B, in an embodiment of the present invention, the position detection module 11 divides the display 200 into 9 areas, A1-A9, in the form of a 3-by-3 grid. In addition, each area is set to respectively correspond to at least one set direction (for example, the dotted arrow direction shown in FIG. 4B). For example, the corner areas A1, A3, A7, and A9 in the display 200 only correspond to one set direction. The interval areas A2, A4, A5, A6, and A8 between two corner areas correspond to two set directions. It should be noted that the corresponding at least one set direction in each area can be changed with different designs and is not limited thereto. Accordingly, the position detection module 11 can determine to which area the current location of the cursor corresponds by detecting the current location of the corresponding coordinate of the cursor to realize at least one set direction corresponding to the location.

S2: Determining whether any set direction corresponding to the location of the cursor is different from the indicated direction.

After the detection of the current location of the cursor, the direction comparison module 12 will compare the current direction indicated by the cursor and each set direction corresponding to the current location of the cursor to determine if any set direction corresponding to the location of the cursor is different from the indicated direction. If it is determined that any set direction corresponding to the location of the cursor is different from the indicated direction, step S3 will follow. If it is determined that all set directions corresponding to the location of the cursor is not different from the indicated direction, step S1 will be repeated to continue detecting the location of the cursor in the display.

As shown in FIG. 4B, for example, the current location of the cursor 100 is located in area A2 and the cursor tip 101 of the cursor 100 indicates the upper left. Based on the foregoing settings, the corresponding setting of A2 is toward the upper right, so after the direction comparison module 12 compares the corresponding set direction of A2 to the direction indicated by the cursor 100, it is determined that the set direction is different from the indicated direction, and step S3 will follow.

Moreover, it is assumed that the location of the cursor 100 is area A2 and the indicated direction indicates the upper left. Since the set directions of area A2 are the upper left and the upper right, the direction comparison module 12 will compare each set direction corresponding to area A2 to the indicated direction. Although one of the two set directions is the same as the indicated direction, the set direction toward the upper right is different from the indicated direction, so step S3 will follow.

Moreover, it is assumed that the location of the cursor 100 is in area A1 and the indicated direction indicates the upper left. Since the corresponding set direction of area A1 is toward the upper left and after the direction comparison module 12 compares the indicated direction to the corresponding direction of area A1, it is determined that the set direction is the same as the indicated direction, so step S1 will be repeated. The set directions of other areas and the indicated direction indicated adopt the same method of determination.

S3: Displaying a direction for adjustment prompting information to prompt at least one adjustable direction of the location.

When it is determined that all set directions corresponding to the location of the cursor is different from the indicated direction, the directional adjustment prompting module 13 displays the directional adjustment prompting information in the display to prompt at least one adjustable direction of the cursor corresponding to the location of the cursor. In an embodiment of the present invention, at least one adjustable direction is the at least one set direction corresponding to the area of the cursor. That is, if the current area of the cursor corresponds to only a single set direction, then the directional adjustment prompting information will display only a single adjustable direction that is the same as the set direction. If the current area of the cursor corresponds to multiple set directions, the directional adjustment prompting information will display a number of multiple adjustable directions equal to the number of multiple set directions.

In addition, as shown in FIG. 4B, for example, no matter which direction is indicated by the cursor tip 101 of the cursor 100, after the cursor 100 enters the area (e.g., area A2), the directional adjustment prompting information of all set directions corresponding to the area will be displayed (for example, the icon buttons 110 on the upper left and top right are displayed at the same time), to prompt the adjustable direction of the cursor to the user.

Figure 5A:
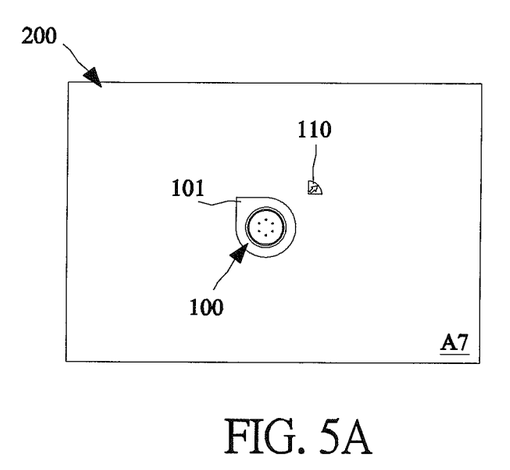
FIGS. 5A and 5B are schematic diagrams of the cursor in different areas of the display of the present invention.
Figure 5B:
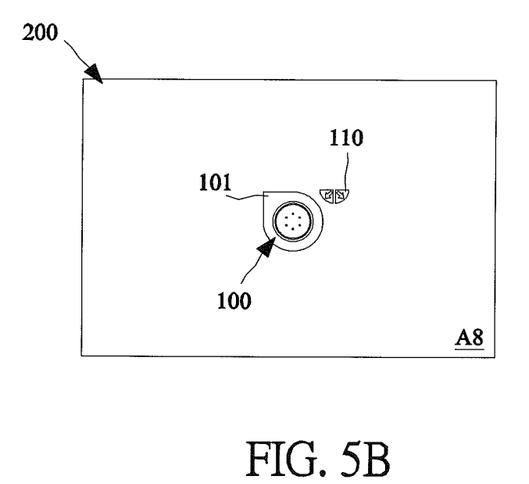

Furthermore, in another embodiment of the present invention, the directional adjustment prompting module 13 defines whether each adjustable direction is a set direction different from the current direction indicated by the cursor. Refer to FIGS. 5A and 5B, which are schematic diagrams of the cursor in different areas of the display of the present invention. As shown in FIG. 5A, for example, if the cursor tip 101 of the cursor 100 indicates the upper left and the set directions of area A2 correspond to upper right and upper left, then when the cursor 100 enters area A2, only the icon button 110 towards the upper right will be displayed. Also, as shown in FIG. 5B, assuming that the cursor tip 101 of the cursor 100 indicates the upper left and the set directions of area A8 correspond to lower right and lower left, then when the cursor 100 enters area A8, the icon buttons 110 towards the lower right and lower left will be displayed simultaneously.

Figure 6:
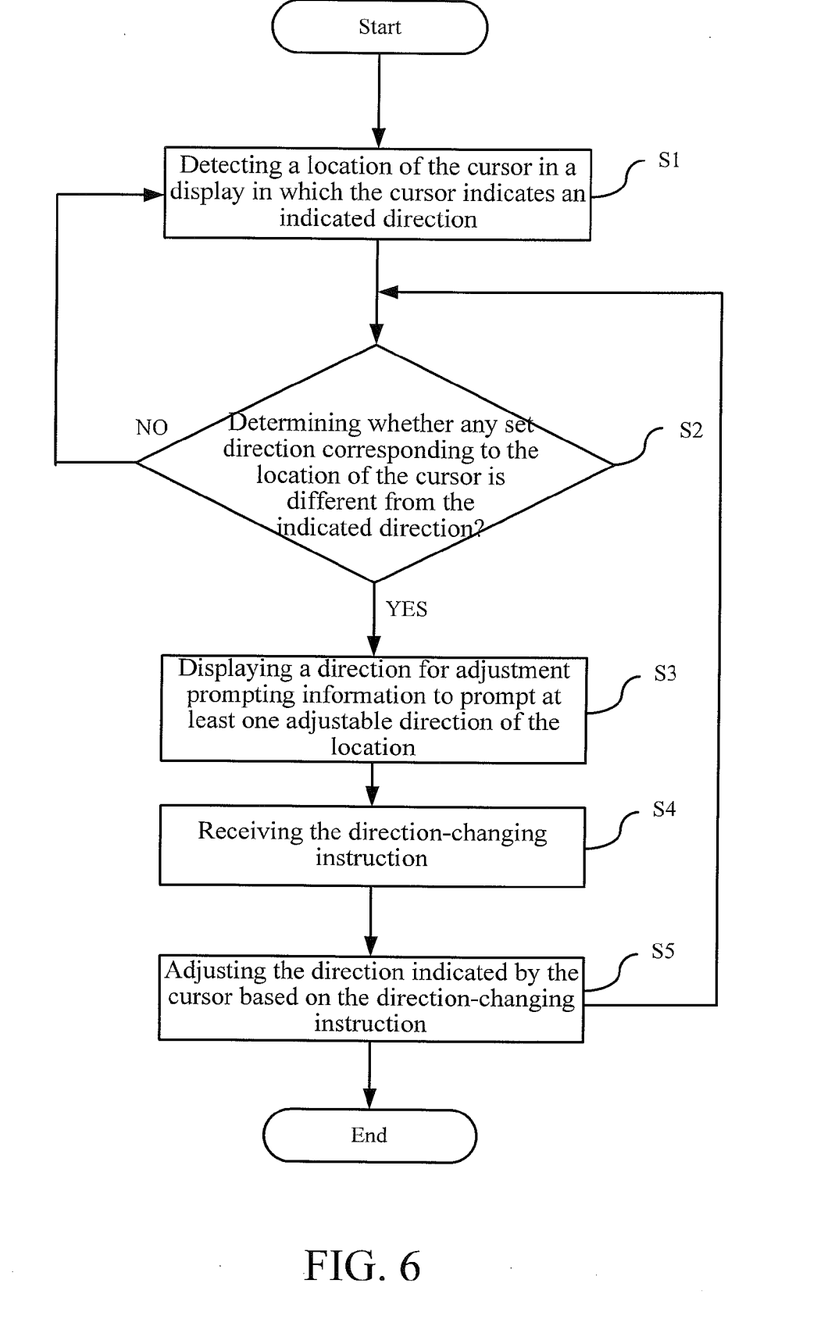
FIG. 6 is a flow chart of another embodiment of the method for prompting an adjustable direction of a cursor of the present invention.

Please refer to FIG. 6, which is a flow chart of another embodiment of the method for prompting an adjustable direction of a cursor of the present invention. As shown in FIG. 6, in this embodiment, the prompting method of an adjustable direction of a cursor of the present invention further comprises steps S4 and S5. In the following section, the steps will be described in detail.

S4: Receiving the direction-changing instruction.

After a direction for adjustment prompting information is displayed, the user can enter the direction-changing instruction according to the adjustable direction recommended by the directional adjustment prompting information. In one embodiment of the present invention, since the directional adjustment prompting information adopts the form of icon buttons, the user can directly press the icon button corresponding to the direction to enter the direction-changing instruction, but the method of entering instructions is not limited thereto. When the directional adjustment module 14 detects that the icon button is touched, the direction-changing instruction is received and step S5 will be executed subsequently according to the direction-changing instruction.

S5: Adjusting the direction indicated by the cursor based on the direction-changing instruction.

The directional adjustment module 14 adjusts the direction indicated by the cursor based on the direction-changing instruction so that the user can use the cursor to choose an object or perform an operation. After the indicated direction is adjusted, step S2 will be repeated to compare the current adjusted indicated direction and the set direction of the area to determine whether new directional adjustment prompting information is to be displayed.

Figure 7:
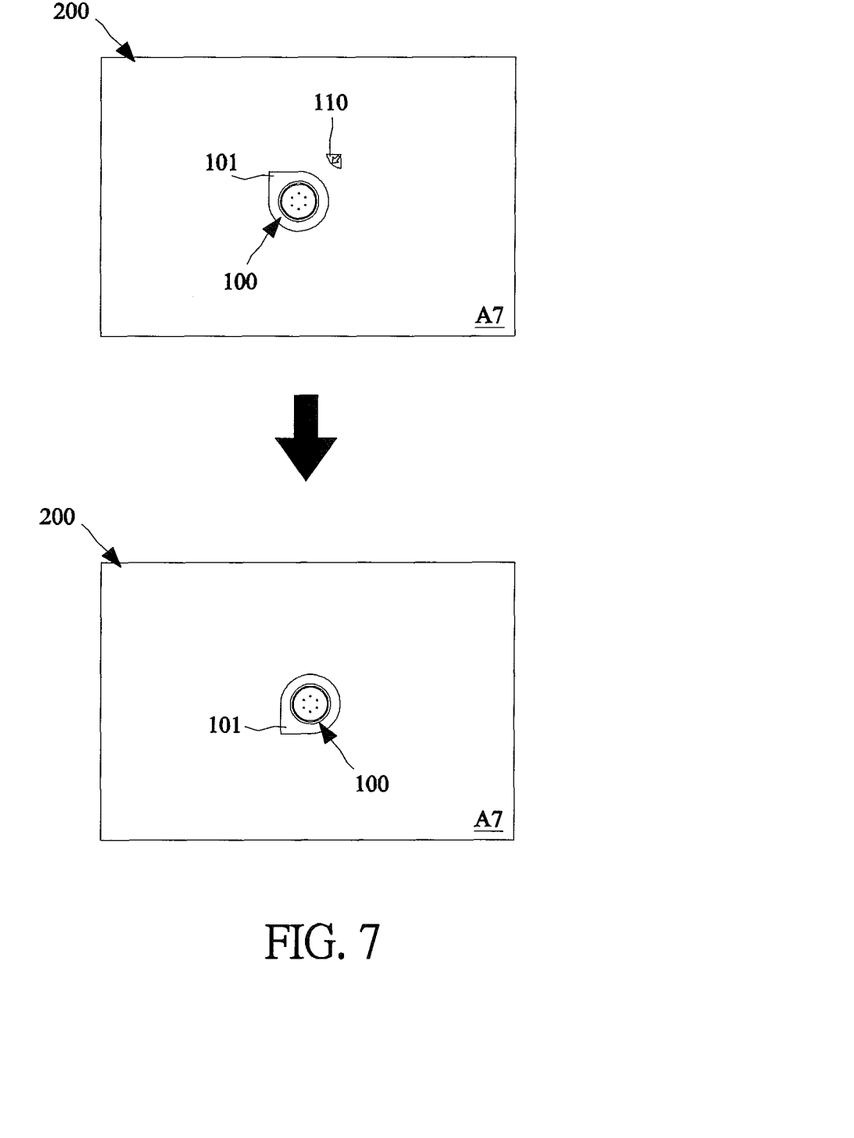
FIG. 7 is a schematic diagram of the cursor changing the indicated direction.

Please refer to FIG. 7, which is a schematic diagram of the cursor changing the indicated direction. For example, suppose that the cursor tip 101 of the cursor 100 indicates the upper left originally. When the cursor 100 enters area A7, the icon button 110 towards the lower left will be displayed. When the user presses the icon button 110, the cursor 100 can adjust its indicated direction such that the cursor tip 101 indicates the lower left. After the direction indicated by the cursor 100 is adjusted, and since the direction is the same as the set direction of area A7, it is not necessary to display the icon button 110, and it can be eliminated from the display.

Accordingly, the present invention can display the corresponding directional adjustment prompting information based on the location of the cursor in the display to alert the user to adjust the direction of the cursor as needed. In addition, the user can also adjust the direction indicated by the cursor to improve the convenience of operation in response to the operational needs of the display.

In summary, regardless of the purposes, means and effectiveness, this invention has significant differences from the characteristics of the prior art. However, it is noted that the above-mentioned embodiments are presented only for illustrative purposes. The scope of this invention should depend on the claims rather than be limited to the embodiments.

What is claimed is:

1. A prompting method applied to a portable electronic apparatus, comprising:
    moving a cursor on a display of the portable electronic apparatus:
    detecting a location of the cursor in the display of a sub-screen of a bigger virtual screen in which the cursor indicates an indicated direction, wherein the location corresponds to at least one set direction;
    determining whether the at least one set direction corresponding to the location of the cursor is different from the indicated direction;
    displaying a directional adjustment prompting information and prompting at least one adjustable direction when at least one of the at least one set direction corresponding to the location of the cursor is different from the indicated direction wherein the directional adjustment prompting information is displayed on the display around the cursor, and a display position of the directional adjustment prompting information changes based on user settings or changes in the location of the cursor and wherein the display is divided into a plurality of areas and each area corresponds to at least one set direction respectively;
    receiving a direction-changing instruction; and
    adjusting the indicated direction of the cursor based on the direction-changing instruction wherein the directional adjustment prompting information is an icon button, and when the icon button is detected as being touched and pressed, the direction-changing instruction is received.

2. A system comprising:
    a portable electronic apparatus having a display;
    a cursor;
    a position detection module, used for detecting the location of the cursor currently on the display of a sub-screen of a bigger virtual screen, wherein the cursor indicates an indicated direction, wherein the location corresponds to at least one set direction;
    a direction comparison module, used to determine when the at least one set direction corresponding to the location of the cursor, detected by the position detection module, is different from the indicated direction;
    a directional adjustment prompting module, used to display a directional adjustment prompting information and to prompt at least one adjustable direction of the cursor a the location of the cursor when the directional adjustment prompting module determines that the at least one set direction corresponding to the location of the cursor is different from the indicated direction wherein the directional adjustment prompting information is displayed on the display around the cursor, and a display position of the directional adjustment prompting information changes based on user settings or changes in the location of the cursor and wherein the display is divided into a plurality of areas and each area corresponds to at least one set direction respectively; and
    a directional adjustment module, used to receive a direction-changing instruction for adjusting the indicated direction of the cursor based on the direction-changing instruction wherein the directional adjustment prompting information is an icon button, and when the icon button is detected as being touched and pressed, the direction-changing instruction is received.

* * * * *